United States Patent
Tang et al.

(10) Patent No.: US 10,427,662 B2
(45) Date of Patent: Oct. 1, 2019

(54) INNER BRAKE MOTOR

(71) Applicant: Nanjing Kangni Precision Mechanics Co., Ltd., Nanjing (CN)

(72) Inventors: Dalian Tang, Nanjing (CN); Bin Xie, Nanjing (CN)

(73) Assignee: Nanjing Kangni Precision Mechanics Co. Ltd., Nanjing (CN)

(*) Notice: Subject to any disclaimer, the term of this patent is extended or adjusted under 35 U.S.C. 154(b) by 0 days.

(21) Appl. No.: 15/984,322

(22) Filed: May 19, 2018

(65) Prior Publication Data
US 2019/0106096 A1   Apr. 11, 2019

(30) Foreign Application Priority Data

Oct. 10, 2017  (CN) .......................... 2017 1 0932868

(51) Int. Cl.
| | | |
|---|---|---|
| *B60T 13/74* | (2006.01) | |
| *F16D 55/02* | (2006.01) | |
| *F16D 65/00* | (2006.01) | |
| *F16D 65/12* | (2006.01) | |
| *F16D 65/18* | (2006.01) | |
| *H02K 49/06* | (2006.01) | |
| *F16D 63/00* | (2006.01) | |
| *F16D 127/02* | (2012.01) | |
| *B60K 7/00* | (2006.01) | |
| *F16D 55/00* | (2006.01) | |
| *F16D 65/02* | (2006.01) | |

(Continued)

(52) U.S. Cl.
CPC ............ *B60T 13/748* (2013.01); *F16D 55/02* (2013.01); *F16D 63/006* (2013.01); *F16D 65/0043* (2013.01); *F16D 65/0081* (2013.01); *F16D 65/127* (2013.01); *F16D 65/186* (2013.01); *H02K 49/06* (2013.01); *B60K 7/0007* (2013.01); *B60K 2007/0061* (2013.01); *B60T 1/005* (2013.01); *F16D 2055/0075* (2013.01); *F16D 2065/1304* (2013.01); *F16D 2121/20* (2013.01); *F16D 2127/02* (2013.01)

(58) Field of Classification Search
CPC ........ B60T 13/74; B60T 13/748; F16D 55/02; F16D 65/127; F16D 65/186; H02K 49/06
USPC ....... 188/71.5, 156–164, 218 XL; 192/70.12, 192/107 C, 107 R, 107 T, 108, 223.1; 180/2.2, 165; 310/77, 93, 99, 103
See application file for complete search history.

(56) References Cited

U.S. PATENT DOCUMENTS

| | | | | |
|---|---|---|---|---|
| 2,863,326 A | * | 12/1958 | Maurice .................. | F16D 27/00 192/105 R |
| 3,400,797 A | * | 9/1968 | Horn ....................... | F16D 27/09 188/161 |

(Continued)

*Primary Examiner* — Christopher P Schwartz
(74) *Attorney, Agent, or Firm* — Anna Tsang

(57) ABSTRACT

An inner brake motor includes a stator assembly, a rotor assembly connected to the stator assembly, and a magnetic brake assembly connected to the rotor assembly. The rotor assembly has a rotor cover sleeved on the periphery of the stator assembly. The magnetic brake assembly has a movable piece selectively attached to or detached from the rotor assembly. A convex-concave brake structure is formed between the movable piece and the rotor cover. The magnetic brake assembly brakes by frictionally engaging with the rotor assembly through the brake structure, thereby achieving the effect of simplifying the brake structure and reducing the volume of the inner brake motor.

11 Claims, 7 Drawing Sheets

(51) Int. Cl.
 *F16D 121/20* (2012.01)
 *B60T 1/00* (2006.01)

(56) References Cited

U.S. PATENT DOCUMENTS

| | | | | |
|---|---|---|---|---|
| 3,562,565 | A * | 2/1971 | Higashino | H02K 7/1028 |
| | | | | 310/77 |
| 3,945,476 | A * | 3/1976 | de Jong | F16D 65/847 |
| | | | | 192/12 D |
| 4,135,612 | A * | 1/1979 | Lengsfeld | H02K 7/1125 |
| | | | | 192/110 B |
| 4,430,592 | A * | 2/1984 | Manktelow | F16D 55/02 |
| | | | | 188/161 |
| 4,773,518 | A * | 9/1988 | Raad | F16D 27/118 |
| | | | | 192/69.81 |
| 4,980,591 | A * | 12/1990 | Takanashi | F16D 43/2024 |
| | | | | 192/223.1 |
| 9,157,528 | B2 * | 10/2015 | Corsetti | B60K 6/48 |
| 9,771,988 | B2 * | 9/2017 | Feusse | B60K 7/0007 |
| 2004/0069586 | A1 * | 4/2004 | Sasse | F16D 13/72 |
| | | | | 192/70.12 |
| 2007/0089946 | A1 * | 4/2007 | Mao | A61G 5/045 |
| | | | | 188/171 |
| 2012/0146438 | A1 * | 6/2012 | Ide | H02K 7/1023 |
| | | | | 310/77 |
| 2012/0153753 | A1 * | 6/2012 | Hanlon | F16D 65/14 |
| | | | | 310/77 |
| 2014/0375151 | A1 * | 12/2014 | Furlan | H02K 7/1025 |
| | | | | 310/49.54 |

* cited by examiner

INNER BRAKE MOTOR

BACKGROUND OF THE INVENTION

1. Field of the Invention

The present invention relates to a vehicle motor used in electric wheelchairs, electric scooters and electric bicycles, and more particularly to an inner brake motor.

2. Description of the Prior Arts

Due to the rising environmental awareness and scarcity f resources in recent years, the utilization of renewable energy is regarded as the most important technology of the next generation. Therefore, a variety of environmental technologies have also been applied around the world. In particular, the electric vehicle is one of the most valued technologies in recent years.

The conventional electric vehicle is driven by electricity and adopts an inner brake motor as the main power drive, which has the advantages of high speed, low noise and low pollution. In order to achieve a better braking effect, the magnetic brake assembly of the inner brake motor has multiple pieces including a fixed piece, a friction piece, and a movable piece. Although the magnetic brake assembly can achieve an excellent braking effect, it occupies much space. In order to reduce the volume of the brake motor and maintain a good braking effect, the inventor believes that the conventional inner brake motor still has room for improvement.

SUMMARY OF THE INVENTION

In view of the shortcomings of the conventional inner brake motor, the present invention provides an inner brake motor. The inner brake motor has a concave-convex brake structure inside the motor, which can simplify the conventional multi-piece brake and reduce the internal space and the overall volume of the inner brake motor.

To achieve the foregoing objective, an inner brake motor in accordance with the present invention comprises a stator assembly, a rotor assembly, and a magnetic brake assembly. The rotor assembly is connected to and is rotatable relative to the stator assembly, and has a rotor cover sleeved on a periphery of the stator assembly. The magnetic brake assembly is connected to a motor shaft, is located at one side of the rotor assembly, and has a magnetic brake base and a movable piece connected to the magnetic brake base. The movable piece can be selectively attached to or detached from the rotor cover of the rotor assembly, and a concave-and-convex brake structure is formed between the movable piece and the rotor cover of the rotor assembly for braking the rotor assembly.

Preferably, the brake structure is formed on a surface of the movable piece that is opposite to the rotor cover.

Preferably, the brake structure forms multiple convex-concave blocks on the movable piece, and the multiple convex-concave blocks surround the movable piece at intervals.

Preferably, the brake structure is formed on a surface of the rotor cover that is opposite to the movable piece.

Preferably, the brake structure forms convex-and-concave blocks around the movable piece at intervals on an outer side of the rotor cover opposite to the movable piece.

Preferably, the brake structure is formed on the mutually opposite surfaces of the rotor cover and of the movable piece.

Preferably, the brake structure forms multiple convex-concave blocks arranged annularly at intervals.

Preferably, the magnetic brake assembly further has a handle and a locating plate covering an outer side of the handle, wherein two or more screws pass through the locating plate and the magnetic brake base to connect to the movable piece.

Preferably, the locating plate is a triangular plate and two or more screws pass through the locating plate and the magnetic brake base to connect to the movable piece.

Preferably, at least one locating pin and at least one locking pin are respectively disposed between the movable piece and the magnetic brake base; or multiple stepped screws are respectively disposed between the movable piece and the magnetic brake base.

In the present invention, a concave-convex brake structure is formed on the rotor assembly, the magnetic brake assembly, or both. The magnetic brake assembly achieves a better braking effect by the magnetic brake assembly and the rotor assembly brake engaging with each other when braking. Based on this, the brake structure can be simplified, the internal spatial configuration and the overall volume of the brake motor can be reduced, thereby making the brake motor compact and practical.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
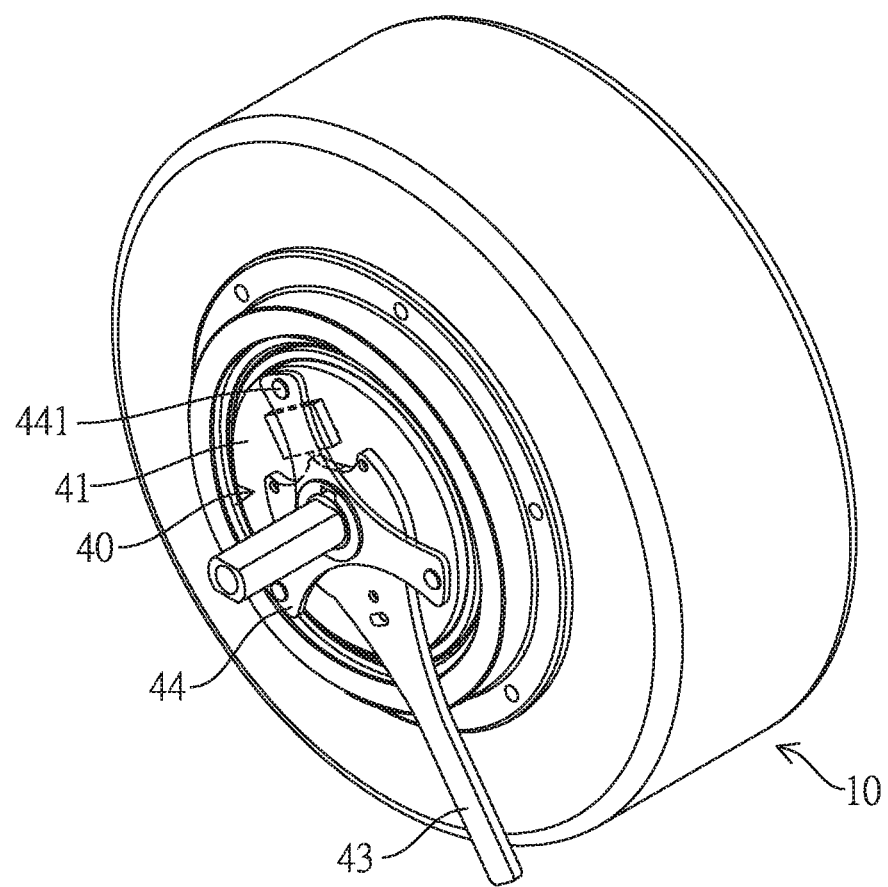
FIG. 1 is a perspective view of a preferred embodiment of the present invention.

Referring to FIGS. 1 to 5, the present invention relates to an inner brake motor, the inner brake motor comprising a hub 10, a stator assembly 20, a rotor assembly 30, a magnetic brake assembly 40, and a decelerator assembly 50, wherein the stator assembly 20, the rotor assembly 30, the magnetic brake assembly 40, and the decelerator assembly 50 are assembled in the hub 10.

Figures 2A, 2B:
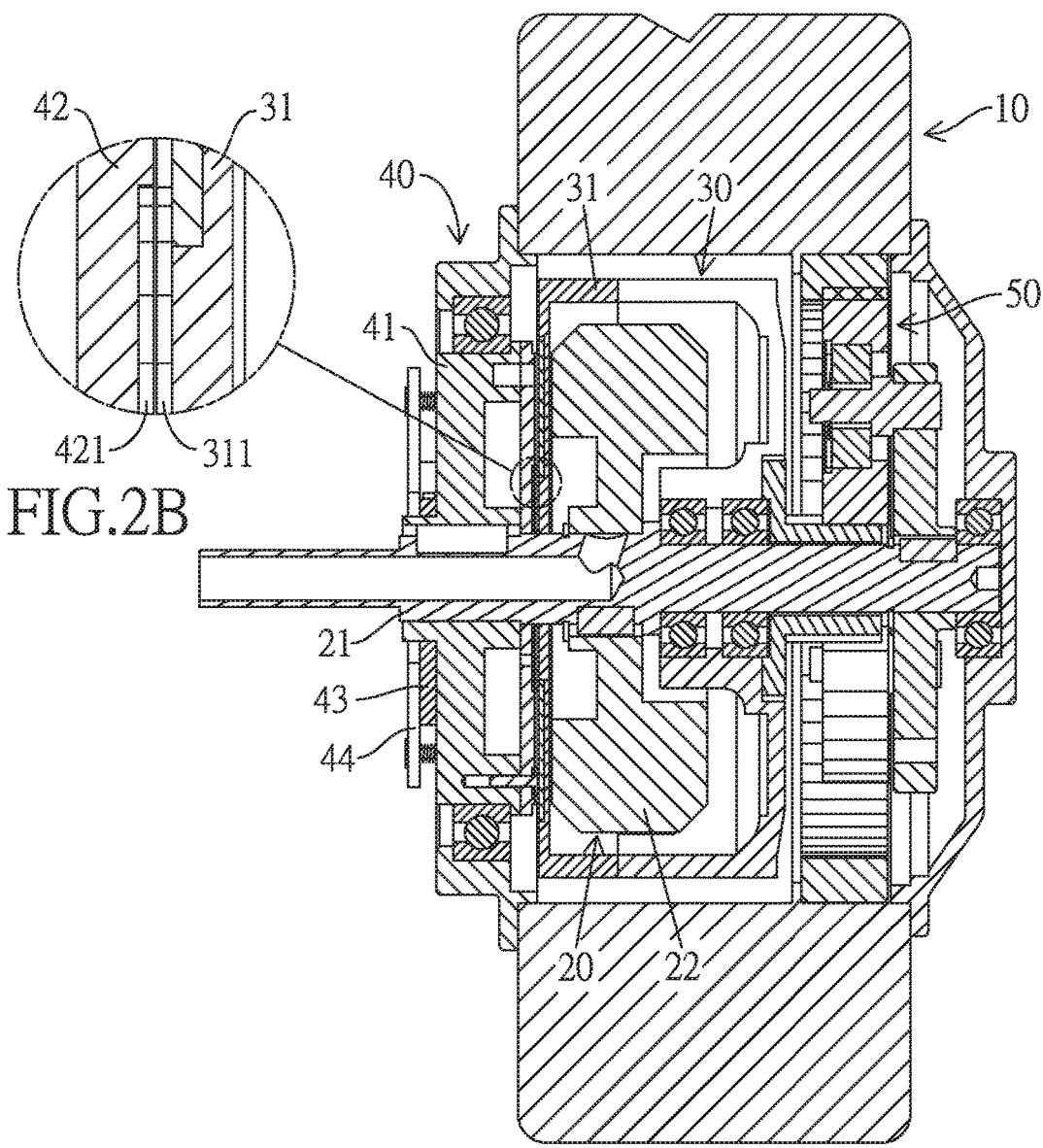
FIG. 2A is a side cross-sectional view of the preferred embodiment of the present invention.
FIG. 2B is an enlarged view of FIG. 2A.

Referring to FIG. 2A and FIG. 2B, the stator assembly 20 includes a motor shaft 21 and a power generation coil 22 coiled on the motor shaft 21. The rotor assembly 30 is connected to the stator assembly 20 and is rotatable relative to the stator assembly 20. The rotor assembly 30 includes a rotor cover 31 covering the periphery of the power generation coil 22 of the stator assembly 20.

Referring to FIG. 2A and FIG. 2B, the magnetic brake assembly 40 is connected to one side of the rotor cover 31 of the rotor assembly 30. The magnetic brake assembly 40 has a magnetic brake base 41, a movable piece 42, a handle 43 and a locating piece 44. The magnetic brake base 41 is bonded and sleeved on the motor shaft 21 of the stator assembly 20. Preferably, the magnetic brake base 41 and the motor shaft 21 are fixed by a flat key, so that the magnetic brake base 41 does not move relative to the motor shaft 21 in the radial direction and is located on the outer side of the rotor cover 31 of the rotor assembly 30. The movable piece 42 is located between the magnetic brake base 41 and the rotor cover 31. The movable piece 42 is selectively attached to or detached from the rotor cover 31 of the rotor assembly A. In the present embodiment, the movable piece 42 is movable relative to the rotor cover 31 by the elasticity of a plurality of return springs.

Figure 3:
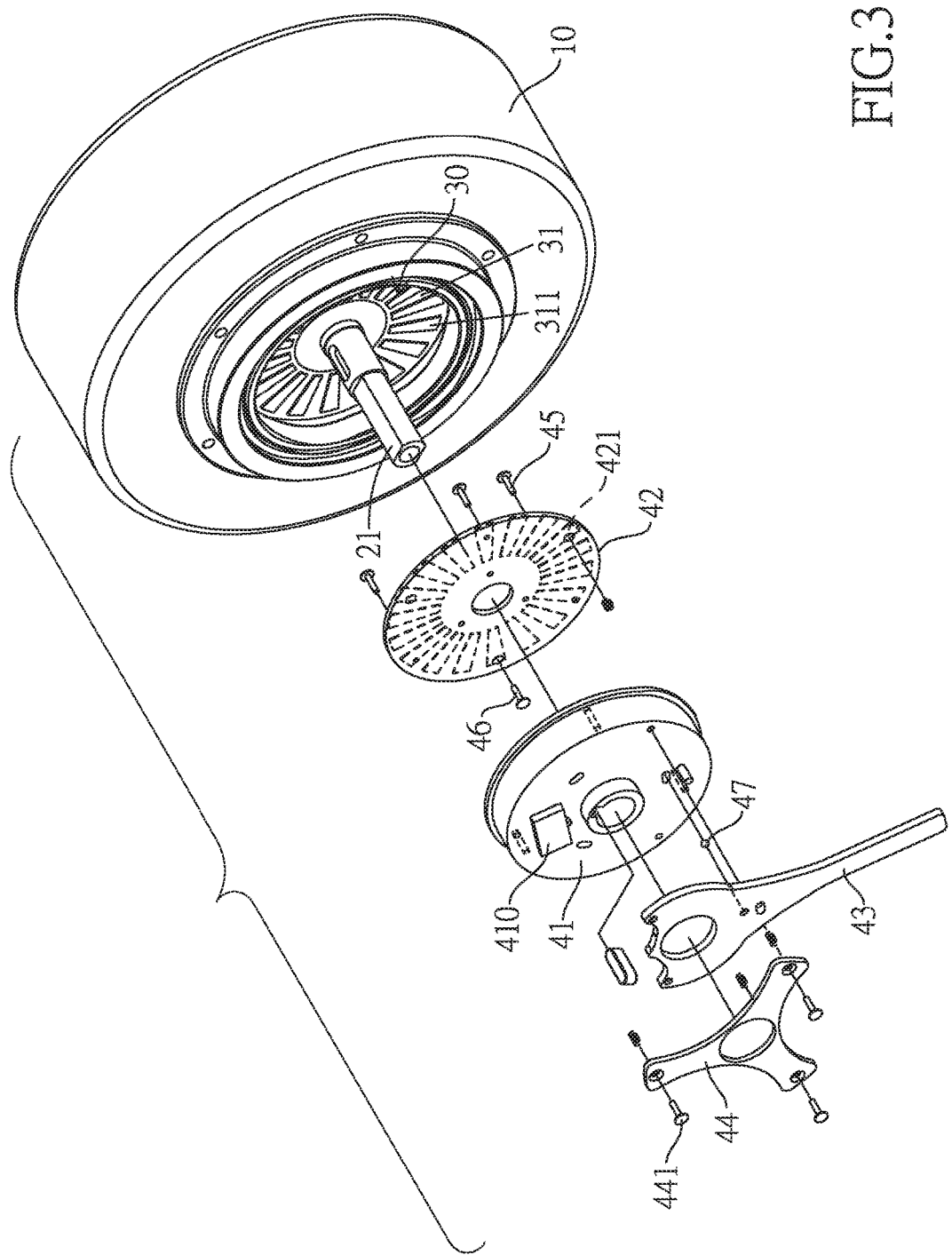
FIG. 3 is a partial exploded perspective view of the magnetic brake assembly in accordance with the preferred embodiment of the present invention.
Figure 4:
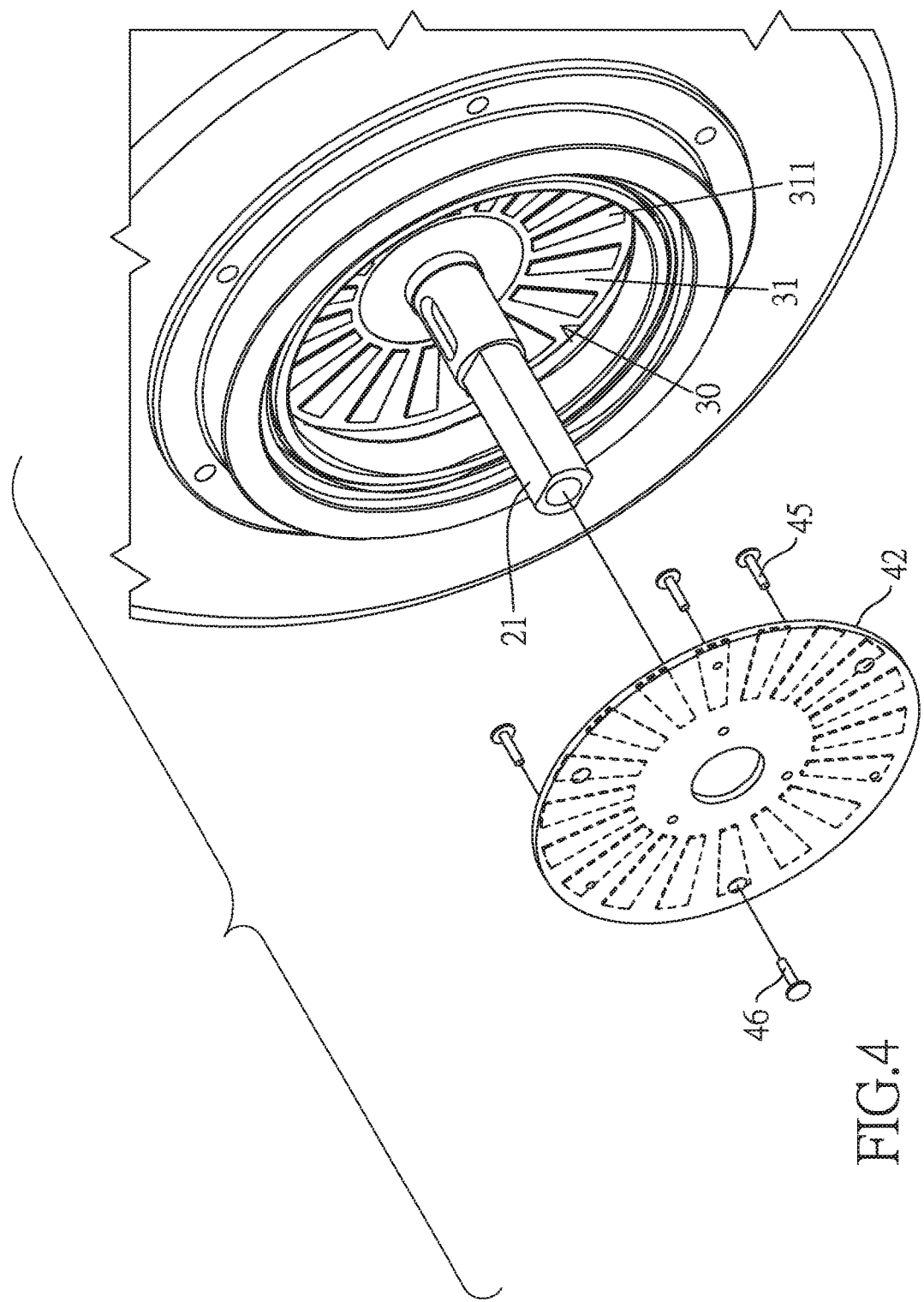
FIG. 4 is a partial exploded view of the movable piece and the rotor cover of the preferred embodiment of the present invention.

With reference to FIG. 3 and FIG. 4, a brake structure is provided between the movable piece 42 and the rotor cover 31. The brake structure is concave-convex, and the concave portion and the convex portion are capable of relatively clamping with each other. In the present embodiment, the brake structure is formed on the mutually opposite surfaces of the rotor cover 31 and of the movable piece 42, and a plurality of convex-concave blocks 311, 421 are arranged in a circle and spaced apart from each other. Each convex-concave block 311 is a trapezoid, but may also be triangular, rectangular or in any other geometric shape, which is not limited herein. The movable piece 42 brakes the rotor cover 31 of the rotor assembly 30 through the brake structure.

In addition, the brake structure may be separately formed on the side of the rotor cover 31 or the movable piece 42. The side of the movable piece 42 or the rotor cover 31 can be frictionally braked by convex-concave engagement. The brake structure is not limited to convex-concave blocks, and alternatively may be grooves. When either surface of the movable piece 42 or the rotor cover 31 is raised relative to the other one, the same effect can be achieved.

Figure 5:
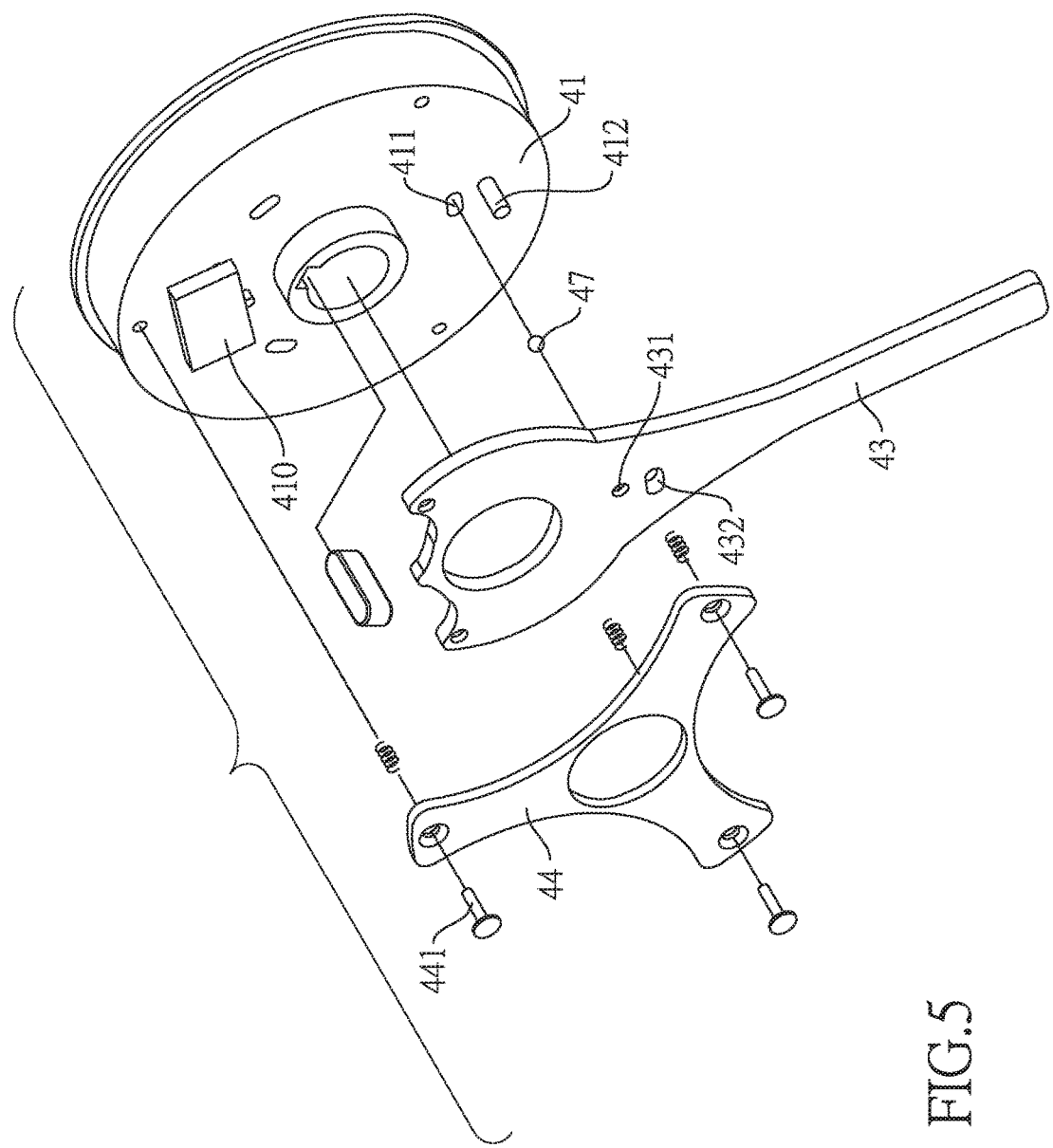
FIG. 5 is an exploded enlarged view of the handle and the magnetic brake base in accordance with the preferred embodiment of the present invention.
Figures 6A, 6B:
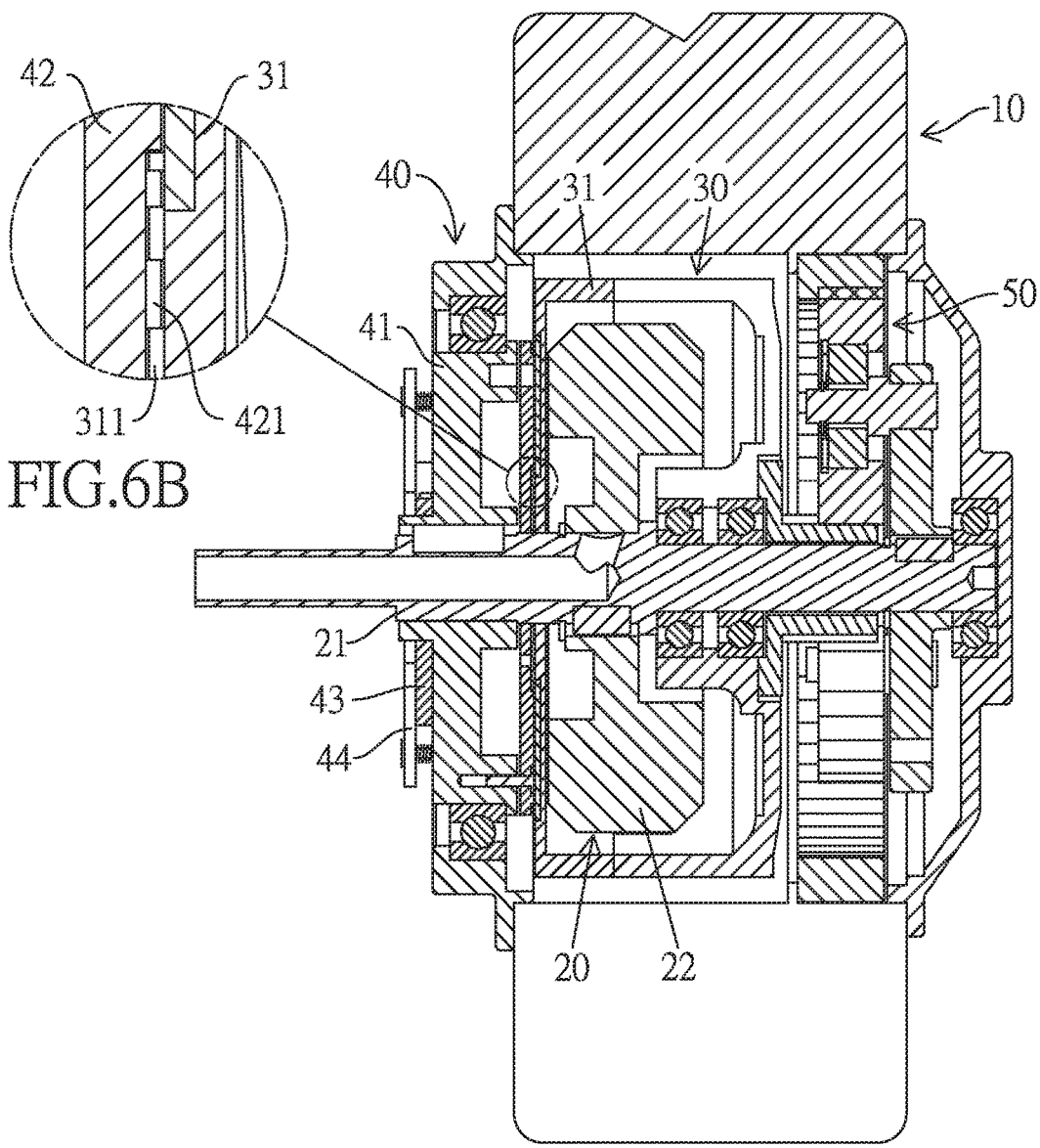
FIG. 6A is a cross-sectional view of the preferred embodiment of the present invention when powered off for braking.
FIG. 6B is an enlarged view of FIG. 6A.
Figure 7:
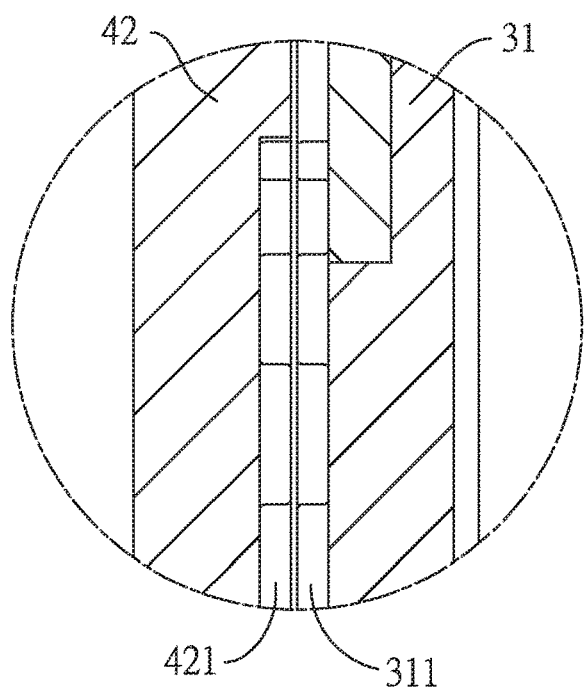
FIG. 7 is an enlarged cross-sectional view of the movable piece and the rotor cover when engaged with each other in accordance with the preferred embodiment of the present invention.
Figure 7:
Figure 7:
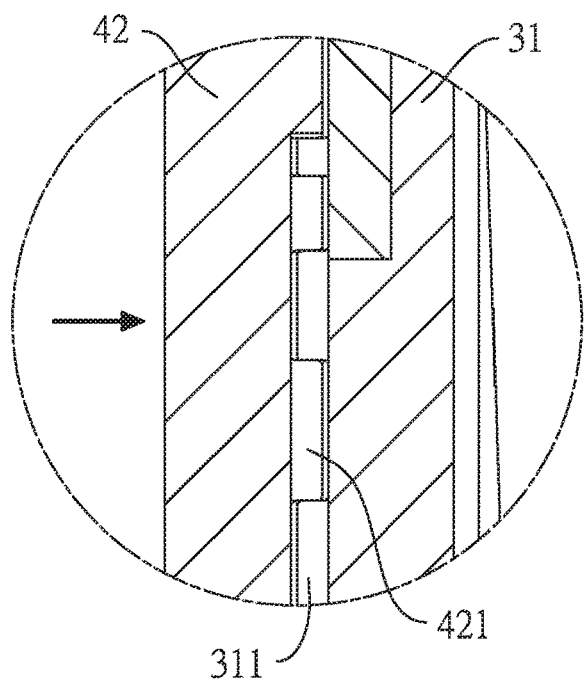

With reference to FIG. 3 to FIG. 5, at least one locating pin 45 and at least one locking pin 46 are provided on the movable piece 42 and the magnetic brake base 41. In this embodiment, three locating pins 45 and three locking pins 46 are provided between the movable piece 42 and the magnetic brake base 41. The locating pins 45 and the locking pins 46 pass through the movable piece 42 and connect to the magnetic brake base 41 at intervals. The locating pins 45 maintain a gap between the movable piece 42 and the magnetic brake base 41. The movable piece 42 is fixed to the magnetic brake base 41 by the locking pins 46 without rotating circularly relative to the magnetic brake base 41. Each locating pin 45 and each locking pin 46 also can be replaced by a stepped screw to realize the function of both the locating pin 45 and the locking pin 46, which is not limited herein.

With reference to FIG. 3 to FIG. 5, the handle 43 and the locating piece 44 are disposed on one side of the magnetic brake base 41 and are opposite to the movable piece 42. At least one locating ball 47 is further disposed between the handle 43 and the magnetic brake base 41. The handle 43 is rotatably sleeved on the magnetic brake base 41 and can switch rotatably a switch 410 provided on the magnetic brake base 41. The handle 43 can switch between a manual drive mode and an electric drive mode. At least one adjusting groove 411 is disposed around the magnetic brake base 41. Each adjusting groove 411 is arc-shaped and has an upper position and a lower position, wherein the groove depth in the upper position is shallower and the groove depth in the lower position is deeper. The handle 43 is provided with at least one spacing hole 431 corresponding in position to the adjusting grooves 411. Each locating ball 47 is respectively clamped in the spacing hole 431 and the adjusting groove 411. Each locating ball 47 can be driven by the handle 43 to slide relative to the spacing hole 431 and the adjusting groove 411. The magnetic brake base 41 is further provided with a limiting pin 412 near the bottom of the magnetic brake base 41. The handle 43 is provided with a slide slot 432 corresponding in position to the limiting pin 412. The handle 43 is disposed in the limiting pin 412 with the slide slot 432 and cooperates with the at least one locating ball 47, so that the position of the handle 43 can be limited when the handle 43 moves relative to the magnetic brake base 41.

Preferably, the locating piece 44 is a triangular piece and covers the outer side of the handle 43. The locating piece 44 can also be a rectangular or polygonal piece, which is not limited herein. The locating piece 44 is locked to the magnetic brake base 41 by three screws 441 and fixes the handle 43 between the magnetic brake base 41 and the locating piece 44. Each screw 441 is used to bear a tensile force in the axial direction so that the handle 43 is not easily separated from the magnetic brake base 41. A plurality of return springs are disposed between the locating piece 44 and the magnetic brake base 41. Each screw 441 sequentially passes through the locating piece 44, each of the return springs, and the magnetic brake base 41.

When the handle 43 is in the manual driving mode, by switching the switch 410, the magnetic brake base 41 does not generate magnetic power. The handle 43 drives the at least one locating ball 47 to slide from the lower position of the adjusting groove 411 to the upper position of the adjusting groove 411. At the same time, the locating piece 44, the screws 441 and the movable piece 42 move outwardly along the motor shaft 21 to separate the movable piece 42 from the rotor cover 31. Therefore, the rotor assembly 30 rotates freely, the motor is in a manual state, and the vehicle can be manually pushed to move.

When in the electric driving mode, the handle 43 drives the at least one locating ball 47 to slide from the upper position of the adjusting groove 411 to the lower position of the adjusting groove 411. At the same time, the locating piece 44, the screws 441 and the movable piece 42 move inwardly along the motor shaft 21 to engage the movable piece 42 with the rotor cover 31. Therefore, the rotor assembly 30 is limited and the vehicle cannot be manually pushed to move. Only when the motor is actuated to generate a current in the inner coils of the magnetic brake base 41, the movable piece 42 can be separated from the rotor cover 31.

With reference to FIG. 2A and FIG. 2B, the decelerator assembly 50 is disposed in the hub 10 relative to the other side of the stator assembly 20, the rotor assembly 30 and the magnetic brake assembly 40. The decelerator assembly 50 is connected to the rotor assembly 30. When the rotor assembly 30 is working, the decelerator assembly 50 is driven to decelerate the hub 10 and the rotor assembly 30 while increasing the effect of torque. The decelerator assembly 50 is a prior art and is not the main technical focus of the present invention, so detailed descriptions thereof are omitted.

With reference to FIG. 2A, FIG. 2B, FIG. 6A, and FIG. 6B, when the motor of the present invention is working in the electric driving mode, the stator assembly 20, the motor shaft 21, the magnetic brake base 41 and the movable piece 42 will not rotate, and the motor shaft 21 is moved axially inwardly or outwardly depending on whether or not a brake command is generated. Meanwhile, when no brake command is received, under the magnetic force of the magnetic brake base 41, the movable piece 42 is attracted to the magnetic brake base 41, clamps with the return springs, and separates from the rotor cover 31. Therefore, when the motor is started to work, the inner coil of the magnetic brake base 41 attracts the movable piece 42 under the electromagnetic force generated after the electric current is applied. Then the convex-concave blocks 421 of the movable piece 42 are separated from the convex-concave blocks 311 of the rotor cover 31, and the brake is released and the motor starts to rotate.

With reference to FIG. 2A, FIG. 2B, FIG. 6A, FIG. 6B, and FIG. 7, when the motor is powered off or a brake command is received, there is no current in the inner coil of the magnetic brake base 41. The movable piece 42 will be ejected by each return spring and abut against the side of the rotor cover 31 to engage with the convex-concave blocks 311, 421 of the brake structure. Therefore, the movable piece 42 is moved toward the rotor cover 31 by the return springs in the magnetic brake base 41, so that the convex-concave blocks 311, 421 engage with each other to obtain an excellent braking effect. In addition, since only a single movable piece 42 is provided in the hub 10, the brake structure can be simplified, the internal space configuration and the volume of the inner brake motor can be reduced, and the inner brake motor can be compact and practical.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. An inner brake motor comprising:
a. stator assembly;
a rotor assembly connected to and being rotatable relative to the stator assembly, and having a rotor cover sleeved on a periphery of the stator assembly; and
a magnetic brake assembly connected to a motor shaft, located at one side of the rotor assembly and having a magnetic brake base and a movable piece connected to the magnetic brake base, wherein the movable piece can be selectively attached to or detached from the rotor cover of the rotor assembly, and a concave-and-convex brake structure is formed between the movable piece and the rotor cover of the rotor assembly for braking the rotor assembly.

2. The inner brake motor as claimed in claim 1, wherein the brake structure is formed on a surface of the movable piece that is opposite to the rotor cover.

3. The inner brake motor as claimed in claim 2, wherein the brake structure forms multiple convex-concave blocks on the movable piece, and the multiple convex-concave blocks surround the movable piece at intervals.

4. The inner brake motor as claimed in claim 1, wherein the brake structure is formed on a surface of the rotor cover that is opposite to the movable piece.

5. The inner brake motor as claimed in claim 4, wherein the brake structure forms multiple convex-concave blocks around the movable piece at intervals on an outer side of the rotor cover opposite to the movable piece.

6. The inner brake motor as claimed in claim 1, wherein the brake structure is formed on the mutually opposite surfaces of the rotor cover and of the movable piece.

7. The inner brake motor as claimed in claim 6, wherein the brake structure forms multiple convex-concave blocks arranged annularly at intervals.

8. The inner brake motor as claimed in claim 1, wherein the magnetic brake assembly further has a handle and a locating plate covering an outer side of the handle, wherein two or more screws pass through the locating plate and the magnetic brake base to connect to the movable piece.

9. The inner brake motor as claimed in claim 8, wherein the locating plate is a triangular plate and two or more screws pass through the locating plate and the magnetic brake base to connect to the movable piece.

10. The inner brake motor as claimed in claim 1, wherein at least one locating pin and at least one locking pin are respectively disposed between the movable piece and the magnetic brake base.

11. The inner brake motor as claimed in claim 1, wherein multiple stepped screws are respectively disposed between the movable piece and the magnetic brake base.

* * * * *